(12) United States Patent  
Asharam et al.

(10) Patent No.: US 11,072,218 B2
(45) Date of Patent: Jul. 27, 2021

(54) COMPRESSED-AIR SUPPLY SYSTEM AND METHOD TO OPERATING A COMPRESSED-AIR SUPPLY SYSTEM

(71) Applicant: WABCO Europe BVBA, Brussels (BE)

(72) Inventors: Suresh Kumar Asharam, Tirupur (IN); Jerald Jeyaseelan, Chennai (IN)

(73) Assignee: ZF CV SYSTEMS EUROPE BV, Brussels (BE)

( * ) Notice: Subject to any disclaimer, the term of this patent is extended or adjusted under 35 U.S.C. 154(b) by 132 days.

(21) Appl. No.: 16/469,669

(22) PCT Filed: Dec. 16, 2016

(86) PCT No.: PCT/IB2016/001769
§ 371 (c)(1),
(2) Date: Jun. 14, 2019

(87) PCT Pub. No.: WO2018/109511
PCT Pub. Date: Jun. 21, 2018

(65) Prior Publication Data
US 2020/0079170 A1 Mar. 12, 2020

(51) Int. Cl.
*B60G 17/052* (2006.01)

(52) U.S. Cl.
CPC .. *B60G 17/0523* (2013.01); *B60G 2206/0116* (2013.01); *B60G 2500/02* (2013.01);
(Continued)

(58) Field of Classification Search
CPC ........ B60G 17/0523; B60G 2206/0116; B60G 2500/02; B60G 2500/203;
(Continued)

(56) References Cited

U.S. PATENT DOCUMENTS 3,054,386 A * 9/1962 Bohnhoff .............. B60T 13/244
137/596.1
4,755,196 A  7/1988 Frania et al.
(Continued)

FOREIGN PATENT DOCUMENTS

CN  101632893 A  1/2010
CN  105822531 A  8/2016
(Continued)

*Primary Examiner* — Atif H Chaudry
(74) *Attorney, Agent, or Firm* — Leydig, Voit & Mayer, Ltd.

(57) ABSTRACT

A compressed-air supply system for operating a pneumatic installation. The compressed-air supply system includes an air supply, the air supply comprising an air compressor unit configured to supply compressed air to a compressed air supply. The compressed-air supply system further includes a compressed air port to the pneumatic installation, an air removal port configured to release air to the environment, and a pneumatic main line between the compressed air supply and the compressed air port, the pneumatic main line comprising an air dryer and a throttle. Furthermore, the compressed-air supply system includes an air removal line between the compressed air port and the air removal port and an exhaust valve connected in the air removal line. The exhaust valve includes a pressure control port connected to the compressed air supply and a pressure counter control port connected to the compressed air port.

20 Claims, 9 Drawing Sheets (52) U.S. Cl.
CPC .. *B60G 2500/203* (2013.01); *B60G 2500/204* (2013.01); *B60G 2500/205* (2013.01)

(58) Field of Classification Search
CPC ........ B60G 2500/204; B60G 2500/205; B01D 53/261; B01D 2259/40003; B60T 17/004
See application file for complete search history.

(56) References Cited

U.S. PATENT DOCUMENTS

| | | | |
|---|---|---|---|
| 4,974,911 | A | 12/1990 | Hart |
| 6,098,967 | A | 8/2000 | Folchert |
| 6,415,815 | B1 * | 7/2002 | Blann ................. F16K 31/1262 137/494 |
| 10,288,092 | B2 | 5/2019 | Frank et al. |
| 2013/0276899 | A1 * | 10/2013 | Frank ................. B60G 17/0523 137/1 |
| 2014/0014201 | A1 * | 1/2014 | Minato .................. F16K 11/22 137/505 |
| 2015/0218987 | A1 * | 8/2015 | Minato ................. B60T 17/008 96/113 |

FOREIGN PATENT DOCUMENTS

| | | | | |
|---|---|---|---|---|
| DE | 3523403 | A1 | 1/1987 | |
| DE | 19627403 | A1 | 1/1998 | |
| DE | 19724747 | C1 | 6/1998 | |
| DE | 102014009419 | A1 | 12/2015 | |
| EP | 0537483 | A1 | 4/1993 | |
| JP | S58210825 | A | 12/1983 | |
| WO | WO 2012079698 | A1 | 6/2012 | |
| WO | WO-2013152868 | A1 * | 10/2013 | ............ B60T 17/004 |
| WO | WO 2013152868 | A1 | 10/2013 | |

* cited by examiner

Fig. 7

COMPRESSED-AIR SUPPLY SYSTEM AND METHOD TO OPERATING A COMPRESSED-AIR SUPPLY SYSTEM

CROSS REFERENCE TO RELATED APPLICATIONS

This application is a U.S. National Stage Application under 35 U.S.C. § 371 of International Application No. PCT/IB2016/001769 filed on Dec. 16, 2016. The International Application was published in English on Jun. 21, 2018, as WO 2018/109511 A1 under PCT Article 21(2).

FIELD

The invention relates to a compressed-air supply system for operating a pneumatic installation, in particular an air-suspension system of a vehicle. The invention also relates to a pneumatic system and a method for operating a compressed-air supply system.

BACKGROUND

A compressed-air supply system is typically used in vehicles, particularly for operating a pneumatic installation in form of an air-suspension system of a vehicle. Such air-suspension system is typically operated in a pressure range between 5 and 20 bar to be supplied by a compressed-air supply.

Compressed air from the compressed-air supply is supplied to the air-suspension the air-suspension being an exemplary pneumatic installation via a compressed air port. For this purpose, a compressed air passes a pneumatic main line between the compressed-air supply and the compressed air port, wherein the pneumatic main line comprises an air dryer and a throttle. The air dryer serves the purpose of adsorbing humidity from the compressed air supplied by the compressed-air supply before entering the compressed air port. In order to depressurize the air-suspension system, dry compressed air is re-circulated through the air dryer in order to generate the air dryer. After leaving the air dryer, the compressed air is typically fed to an air removal line between the compressed air port and an air removal port or releasing air to the environment. An exhaust valve controls removal of compressed air to the air removal port. The exhaust valve comprises a pressure control port connected to the compressed air supply and a pressure counter control port connected to the compressed air port.

A ride control system for vehicles with air springs is known from DE 19 724 747 C1. DE 10 2014 009 419 A1 discloses a compressed air supply system for operating an air-suspension system of a vehicle.

SUMMARY

In an embodiment, the present invention provides a compressed-air supply system for operating a pneumatic installation. The compressed-air supply system includes an air supply, the air supply comprising an air compressor unit configured to supply compressed air to a compressed air supply. The compressed-air supply system further includes a compressed air port to the pneumatic installation, an air removal port configured to release air to the environment, and a pneumatic main line between the compressed air supply and the compressed air port, the pneumatic main line comprising an air dryer and a throttle. Furthermore, the compressed-air supply system includes an air removal line between the compressed air port and the air removal port, the air removal line branching from the pneumatic main line, and includes an exhaust valve connected in the air removal line. The exhaust valve includes a pressure control port connected to the compressed air supply and a pressure counter control port connected to the compressed air port. The exhaust valve also includes a control chamber that is fluidically partitioned by a diaphragm configured to switch the exhaust valve between an opened and a closed state, the diaphragm having an effective area pressurizable via the pressure control port and an opposing effective area pressurizable via the pressure counter control port.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3a illustrates a cross-section of a compressed-air supply system from FIG. 2a;

FIG. 4a illustrates a cutout enlargement from FIG. 2a;

FIG. 5a illustrates a cutout enlargement from FIG. 3a;

DETAILED DESCRIPTION

Embodiments of the invention provide a compressed-air supply system that is particularly robust. Embodiments of the invention provide compressed-air supply systems that comprise an exhaust valve that includes a control chamber that is fluidically partitioned by a diaphragm for switching the exhaust valve between an opened and a closed state. The diaphragm has an effective area pressurized via the pressure control port in an opposing effective area pressurized via the pressure counter control port.

So to say, the exhaust valve can be switched via a differential pressure between the pressure control port and the pressure counter control port. Preferably the differential pressure between the pressure control port and the pressure counter control port results from the throttle comprised by the pneumatic main line. Preferably, the exhaust valve is adapted to switch and/or remain in the closed state, when the pressure effective on the opposing effective area is less than pressure acting on the effective area. Furthermore, the exhaust valve can be adapted to switch to an open state and/or remain in the open state if the pressure acting on the opposing effective area is larger than the pressure acting on the effective area. Preferably a switching of the exhaust valve can be/is effected solely via by a pressure difference over the throttle.

Preferably, the exhaust valve is configured to be normally opened. According to another preferred embodiment, the pressure control port and the pressure control counter port are fluidically connected to each other, preferably independently of pressure, via the air dryer and the throttle.

The exhaust valve can be configured to switch to and/or remain in the closed state if force exerted on the effective area is higher than a counterforce exerted on the opposing effective area. The exhaust valve can be configured to switch to and/or remain in the open state if a force exerted on the effective area is lower than a counterforce exerted on the opposing effective area.

According to a preferred embodiment, the exhaust valve is configured to relieve, in a charging cycle, compressed air into the air removal line, if the absolute pressure on both sides of the diaphragm exceeds 16 bars. A charging cycle is a cycle when compressed air is supplied from the compressed-air supply to the compressed air port.

In another preferred embodiment, the exhaust valve comprises an orifice defining a valve seat. The exhaust valve can comprise a plunger having a valve seal for opening and closing the orifice. Preferably, the plunger is coupled to the diaphragm.

In order to provide a compact arrangement, the diaphragm and the valve seal can be arranged on opposite sides of the orifice.

It is furthermore preferred, when the exhaust valve comprises a valve spring. The valve spring can be serially coupled to the diaphragm. Preferably, the valve spring is arranged to hold the exhaust valve normally opened.

In a particularly preferred embodiment, the exhaust valve comprises a counter spring. The counter spring can be serially coupled to the diaphragm. The counter spring can be arranged to counteract the valve spring.

Preferably, the diaphragm is coaxially arranged to the orifice. It is particularly preferred when a preload of the counter spring is adjustable, preferably adjustable by a screw. Thereby, the differential pressure and/or the absolute pressure threshold, upon which compressed air is relieved into the air removal line, can be adjusted.

According to a preferred embodiment, the valve spring and the counter spring have identical spring constants. The effective area and the opposing effective area can be equal in effective size.

In a preferred embodiment, the throttle has an orifice diameter between 0.7 mm and 1.2 mm.

Embodiments of the invention further provide pneumatic systems comprising a pneumatic installation in form of an air-suspension system for a vehicle, wherein the pneumatic system comprises a compressed-air supply system, such as a compressed-air supply system as described herein, wherein the pneumatic installation is connected or connectable to the compressed air port of the pneumatic system.

Embodiments of the invention further provide methods for operating a compressed-air supply system, such as a compressed-air supply system as described herein, wherein the method, in a charging cycle, comprises the steps of:
  operating the air compressor unit for supplying compressed air to the compressed-air supply;
  guiding a flow of compressed air from the compressed-air supply to the pressure control port and thereby pressurizing the effective area of the exhaust valve in order to switch the exhaust valve into the closed state;
  guiding a flow of compressed air from the compressed air supply via the air dryer and the throttle to the compressed air port in order to supply a pneumatic installation connected to the compressed air port;
  guiding a flow of compressed air from the compressed air supply via the air dryer and the throttle to pressurize the counter control port and thereby pressurizing the opposing effective area of the exhaust valve;
  holding the exhaust valve in a closed state if force exerted on the effective area is higher than the counterforce exerted on the opposing effective area; and
  switching the exhaust valve into the open state if force exerted on the effective area is lower than the counterforce exerted on the opposing effective area.

Alternatively or additionally the method comprises, in a regeneration cycle, the steps of:
  keeping the air compressor units suspended from operation;
  guiding a flow of compressed air from the compressed air port to the counter pressure control port and thereby pressurizing opposing effective area of the exhaust valve;
  guiding a flow of compressed air from the compressed air port to the pressure control port via the air dryer and the throttle and thereby pressurizing the opposing effective area of the exhaust valve;
  switching the exhaust valve into the open state if a force exerted on the effective area is lower than a counterforce exerted on the opposing effective area; and
  guiding a flow of compressed air from the compressed air port via the air removal line to the air removal port.

Preferably, the force exerted on the effective area comprises a first component originating from the compressed air acting on the effective area and a force component originating from the counter spring.

It is also preferred when the force exerted on the opposing effective area comprises a first component originating from compressed air acting on the opposing effective area and a force component originating from the valve spring.

Preferably, within certain methods, a switching of the exhaust valve can be/is effected solely via by a pressure difference over the throttle.

Figure 1:
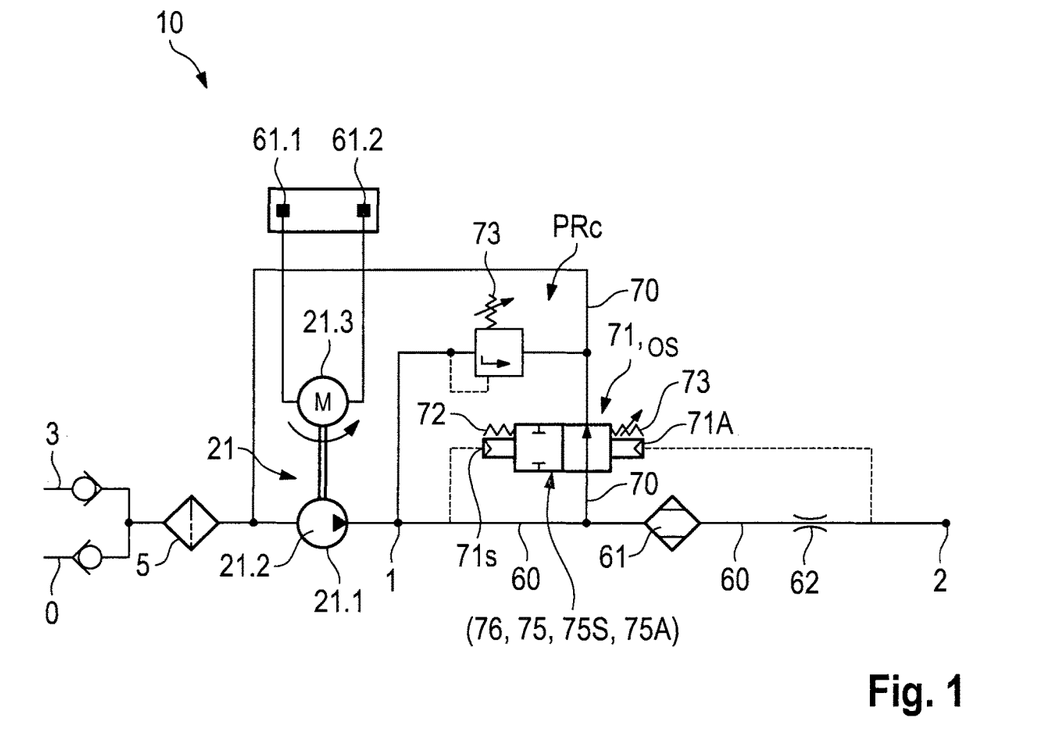
FIG. 1 illustrates a schematic diagram of a compressed-air supply system.

FIG. 1 depicts a schematic diagram of a compressed-air supply system 10 according to a preferred embodiment of the invention. The compressed-air supply system 10 is suitable for operating a pneumatic installation in particular an air suspension system of a vehicle (not shown). Such pneumatic installation can be connected to the compressed air port to the compressed-air supply system 10.

The compressed-air supply system 10 comprises an air supply having an air compressor unit 21 for supplying compressed air to a compressed air supply 1. The air compressor unit 21 comprises an air compressor 21.1 having a compressor chamber 21.2. The air compressor unit also comprises an electrical motor 21.3 which is electrically connected via two leads 61.1, 61.2. The compressed-air supply system 10 comprises an air removal port 3 for releasing air to the environment. An air filter 5 is connected between the air removal port 3 and air compressor 21.1.

A pneumatic main line 60 is arranged between the compressed air supply 1 and the compressed air port 2. A pneumatic main line 60 comprises an air dryer 61 and a throttle 62. An air removal line 70 branches off the pneumatic main line 60 between the compressed air port 2 and the air removal port 3. In the embodiment according to FIG.

1 the air removal line 70 branches off the pneumatic main line 60 between the compressed air supply 1 and the air dryer 61.

The compressed air supply system 10 also comprises an exhaust valve 71 which is connected in the air removal line 70. The exhaust valve 71 comprises a pressure control port 71S connected to the compressed air supply. The exhaust valve 71 also comprises a pressure counter control port 71A connected to the compressed air port 2.

The exhaust valve 71 is configured to be normally opened as can be seen from FIG. 1. The pressure control port 71S and the pressure counter control port 71A are fluidically connected to each other, independently of pressure, via the air dryer 61 and the throttle 62. The exhaust valve 71 comprises a valve spring 72 and a counteracting counter spring 73. A preload PL of the counter spring 73 is adjustable. The exhaust valve 71 comprises a pressure relief component PRC (Pmax function) which is configured to relief compressed air from the air supply 1 to the air removal line 70 if a predefined pressure, for example 16 bar, is exceeded. The pressure relief component PRC relies on the same adjustable counter spring 73. According to the invention the exhaust valve 71 comprises a control chamber 76 which is fluidically partitioned by a diaphragm 75 for switching the exhaust valve 71 between an opened state OS (seen in FIG. 1) and a closed state (not depicted in FIG. 1). The diaphragm 75 has an effective area 75S pressurizable via the pressure control port 71S and an opposing effective area 75A pressurizable via the pressure counter control port 71A.

Figure 1A:
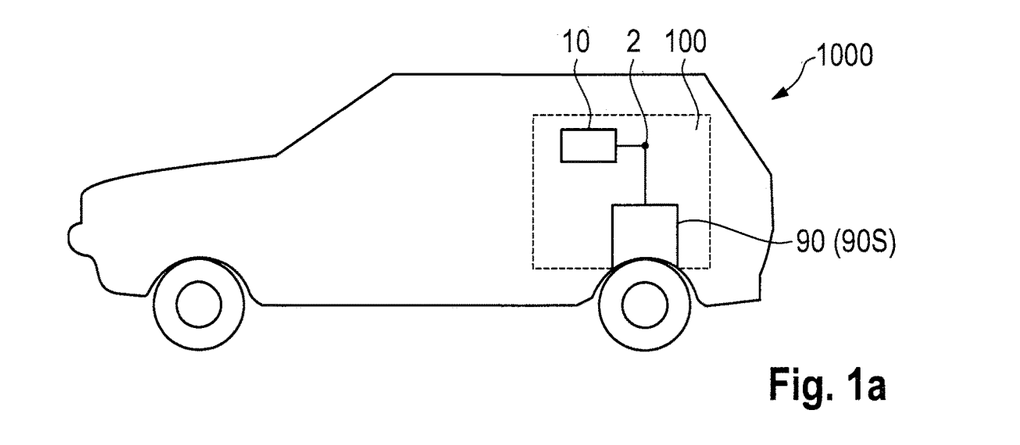
FIG. 1a illustrates a pneumatic system of a vehicle.

FIG. 1 a) shows a pneumatic system comprising 100 comprising a compressed-air supply system 10 and a pneumatic installation 90 in form of an air-suspension system 90S of a vehicle 1000. The compressed air port 2 of the a compressed-air supply system 10 is connected to the pneumatic installation 90.

The control chamber 76, the diaphragm 75, the effective area 75S and the opposing effective area 75A are not shown in detail in FIG. 1 but their function will become apparent from the following figures.

Figure 2A:
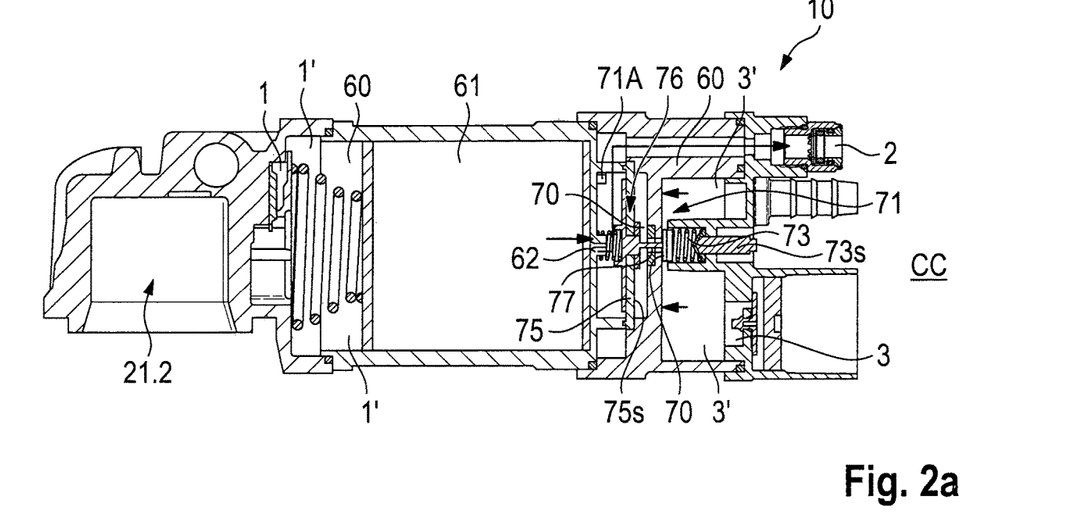
FIG. 2a illustrates a cross-section of a compressed-air supply system in the charging state.
Figure 2B:
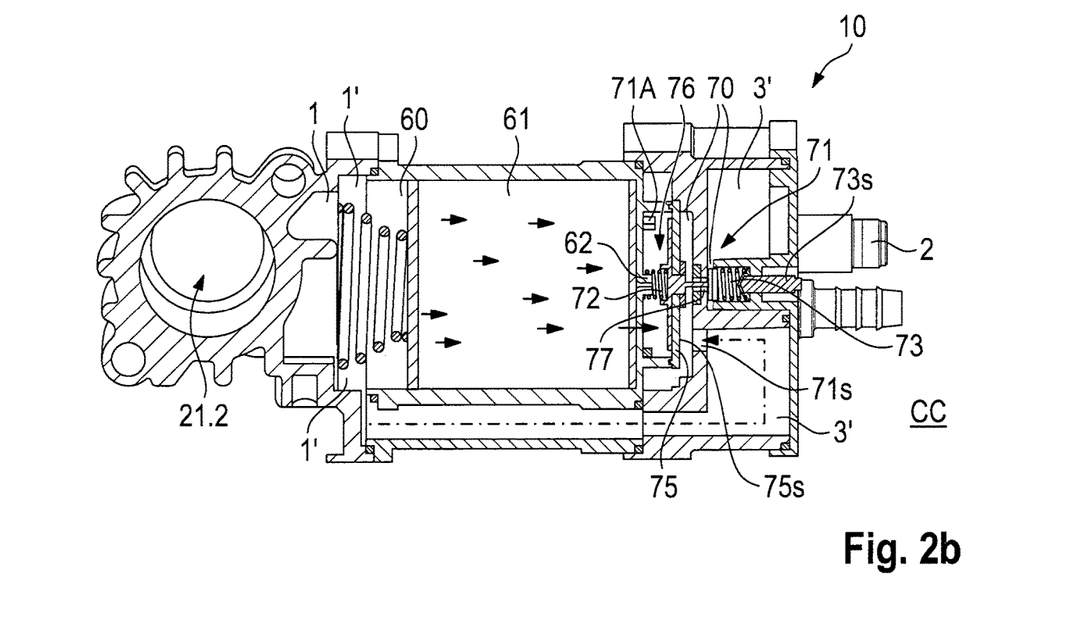
FIG. 2b illustrates a cross-section of a compressed-air supply system in the charging state.
Figure 3A:
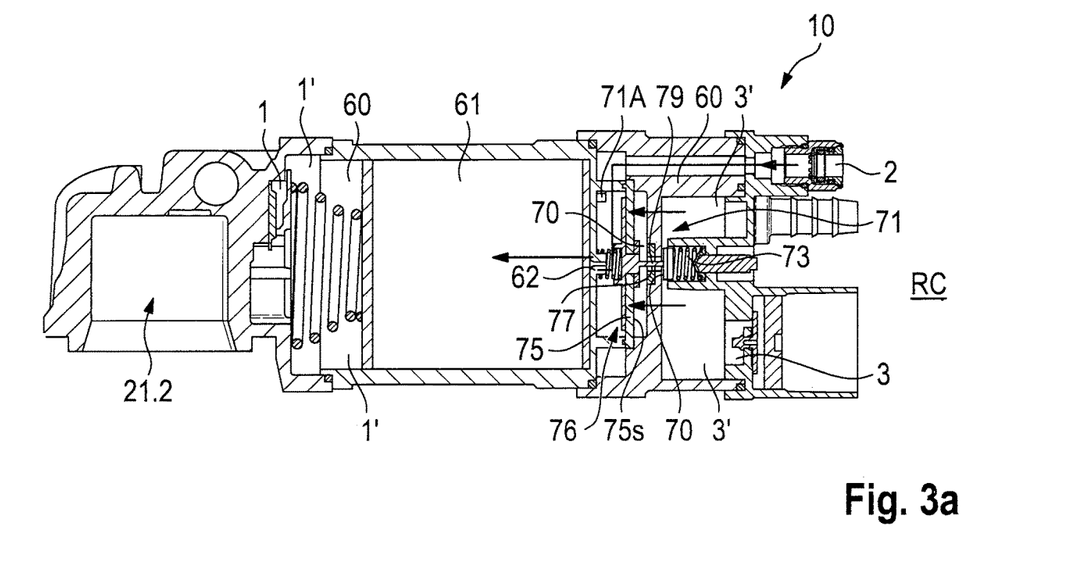
Figure 3B:
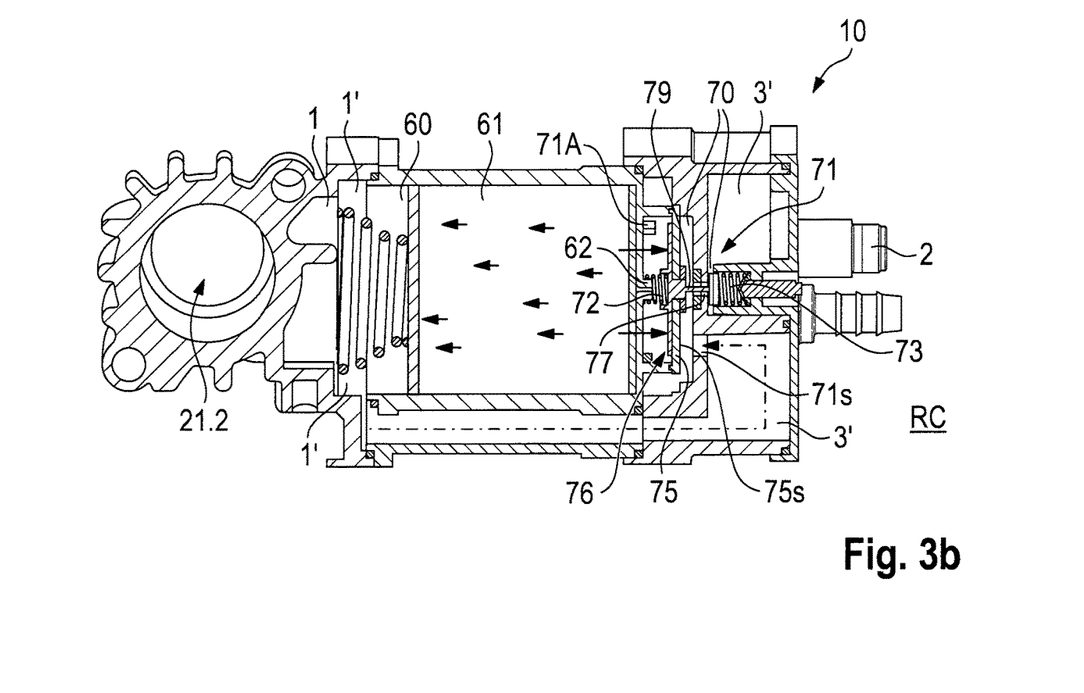
FIG. 3b illustrates a cross-section of a compressed-air supply system from FIG. 2b.
Figure 4A:
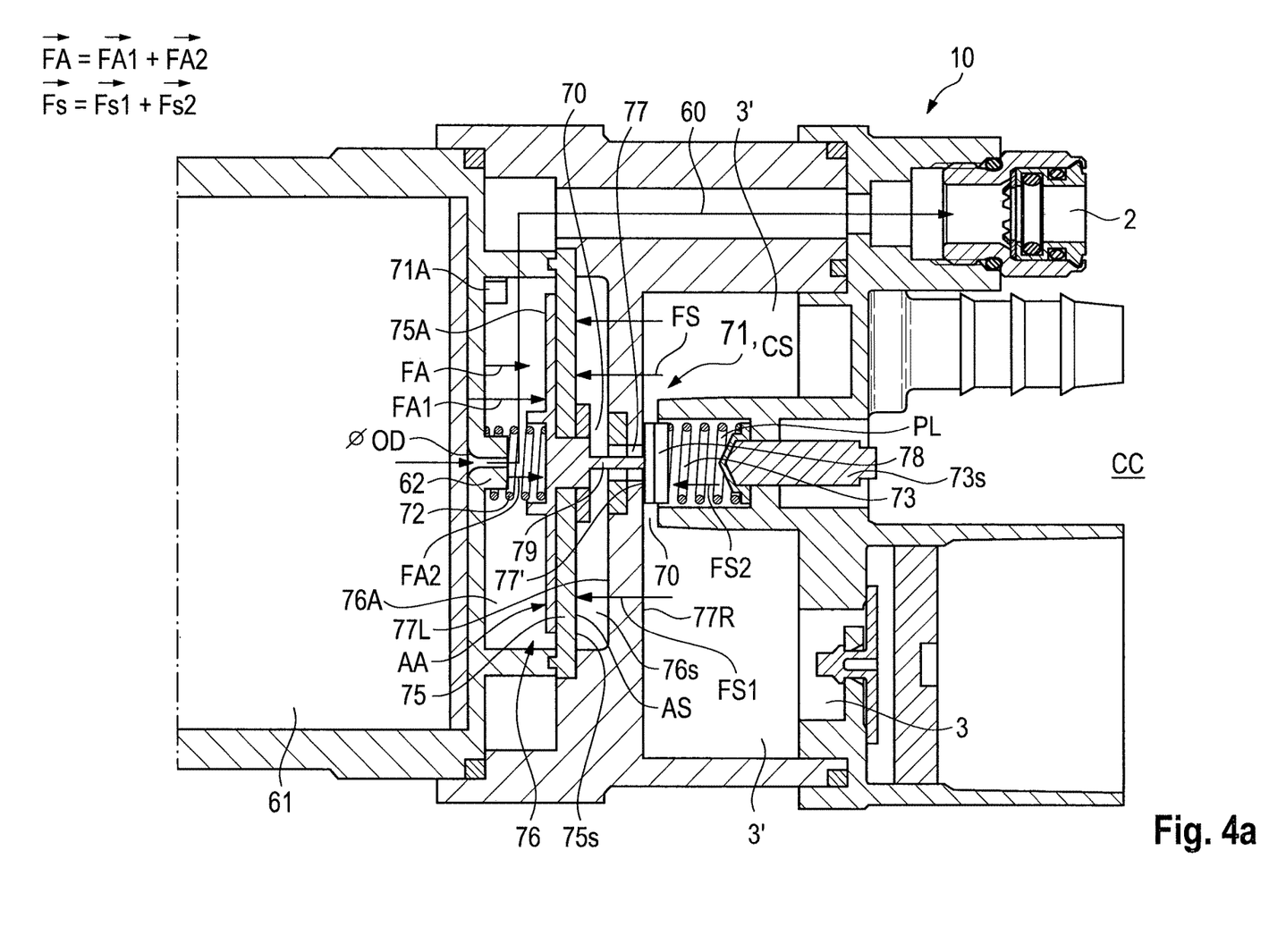
Figure 4B:
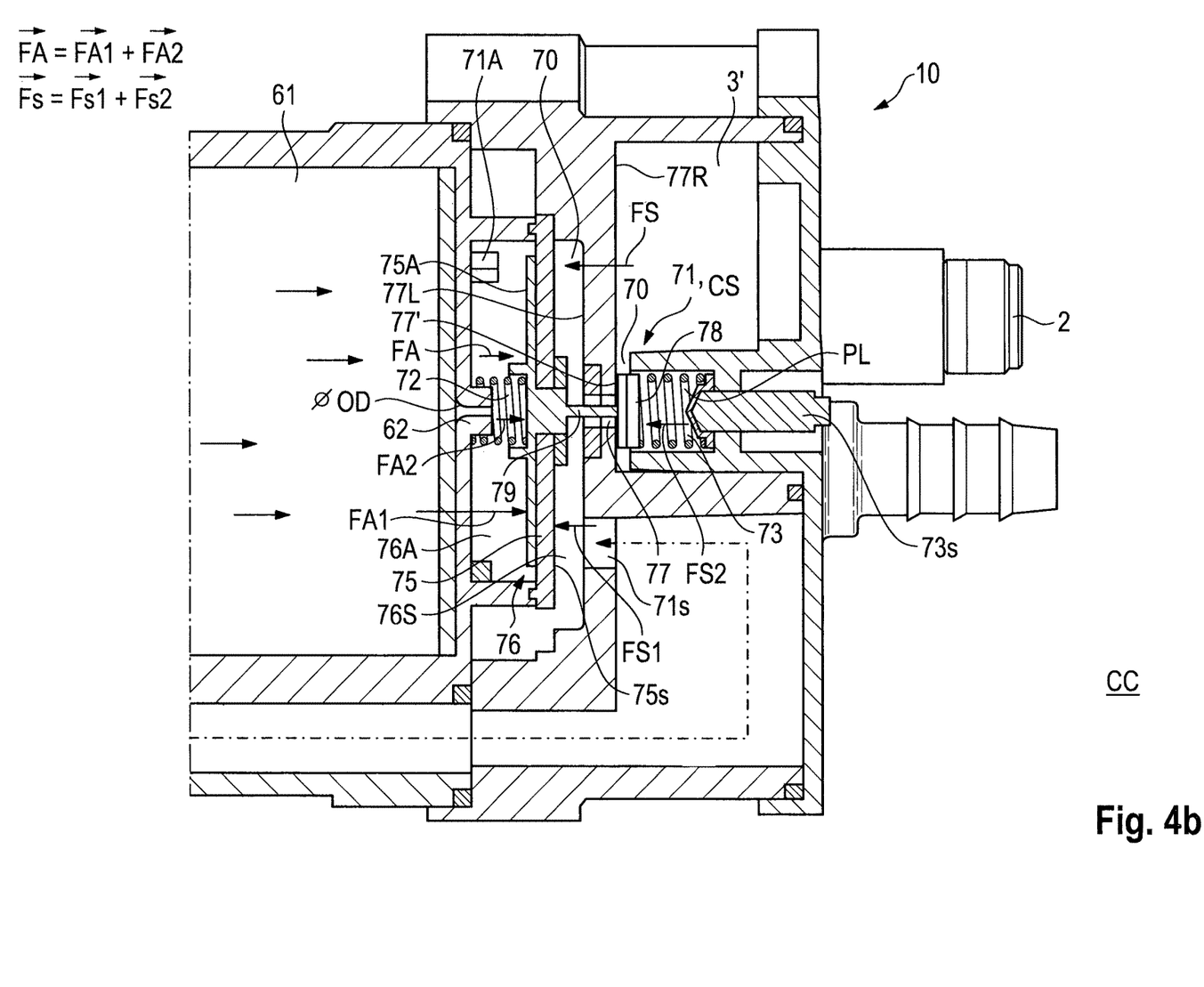
FIG. 4b illustrates a cutout enlargement from FIG. 2b.

FIG. 2 shows two cross sections of one and the same compressed air supply system 10 in the charging cycle CC. FIG. 4a shows a cutout enlargement of FIG. 2a, wherein FIG. 4b shows a cutout enlargement of FIG. 2b.

The left-hand side of FIGS. 2a and b shows a compressor chamber 21.2 for supplying compressed air to an air supply 1. On the upper right side on FIGS. 2a and 2b is located a compressed air port 2 which can lead to a pneumatic installation to be supplied with compressed air. An air removal port 3 for releasing air to the environment is depicted on the lower right side of FIG. 2a. The air supply 1 leads to a supply chamber 1'. The air removal port 60 leads to an air removal chamber 3'. A pneumatic main line 60 having an air dryer 61 and a throttle 62 in form of a throttle plate is connected between the compressed air supply 1 and the compressed air port 2. An air removal line 70 (as can best be seen from FIG. 4a) branches off the pneumatic main line 60 and is arranged between the compressed air port 2 and the air removal port 3.

The compressed air supply system 10 also comprises an exhaust valve 71 connected in the air removal line 70. The exhaust valve 71 comprises a pressure control port 71S. As can be seen from FIG. 2b the pressure control port 71S is embodied by a piloting port of the air removal chamber 3'.

The exhaust valve 71 also comprise a pressure counter control port 71A connected to the compressed air port. As becomes apparent from FIGS. 2a and 2b the pressure counter control port 71A is embodied as a small opening in the left sub-chamber 76A of the control chamber 76.

According to the invention the exhaust valve 71 comprises a control chamber 76 which is fluidically partitioned by a diaphragm 75 for switching the exhaust valve 71 between an opened OS and a closed state CS. In the embodiments according to the figures the diaphragm 75 is embodied by a circular rubber diaphragm which is fixed to a casing part adjacent to the air dryer 61.

The diaphragm 75 has effective area 75S pressurizable via the pressure control port 71S and an opposing effective area 75A pressurizable via the pressure counter control port 71A. As can be seen for example from FIG. 4a the exhaust valve 71 comprises an orifice 77 defining a valve seat 77'. The exhaust valve 71 also comprises a plunger 79 having a valve seal 78 for opening and closing the orifice. The plunger 79 is coupled to the diaphragm 75. As becomes apparent from FIG. 4a, the diaphragm 75 and the valve seal 78 are arranged on opposite sides 77L, 77R of the orifice 77.

The exhaust valve 71 comprises a valve spring 72 that serially coupled to the diaphragm 75. The valve spring 72 is arranged to hold the exhaust valve 71 normally opened (not shown). An exhaust valve 71 in the opened state OS that is when the valve seal 78 does not seal the orifice 77, can be seen in FIG. 5a. The closes state CS of exhaust valve 71, that is the valve seal 78 sealing the orifice 77 becomes apparent from FIG. 4a.

The exhaust valve 71 also comprises a counter spring 73 that is serially coupled to both the diaphragm 75 and the valve spring 72. The counter spring 73 is arranged to counteract the valve spring 72. The diaphragm 75 is coaxially arranged to the orifice, the plunger 79. Furthermore the counter spring 73 and the valve spring 72 coaxially arranged to each other.

A preload PL of the counter spring 73 is adjustable via a screw 73S.

In the following the function of the compressed air supply system 10, particularly the diaphragm 75 will be described with respect to the figures.

FIGS. 2a and 2b, 4a and 4b depict a charging cycle CC in which air is to be supplied from the compressed air supply 1 to the compressed air port 2. FIGS. 3a and 3b and FIGS. 5a and 5b show a compressed air supply system 10 in a regeneration cycle RC in which air is relieved from the compressed air port 2 via the air dryer 61 (in order to regenerate the air dryer) to the air removal port 3.

After beginning to operate the air compressor unit 21, part of the compressed air originating from the compressed air supply 1 is guided to the pressure control port 71S which is embodied as a pilot chamber in the air removal port 3'. The flow of compressed air from the air supply 1 to the pressure control port 71S is depicted in FIGS. 2b and 4b as a dot-dashed line. This air flow from the compressed air supply to the pressure control port 71S pressurizes the effective area 75S of the exhaust valve 71. The effective area 75S of the exhaust valve 71 is located on the right-hand side of the diaphragm 75.

Also, compressed air flows from the compressed air supply 1 via the air dryer 61 and the throttle 62 (which is embodied as a throttle plate), to the pressure counter control port 71A. This flow is depicted by the multiple solid arrows in FIGS. 2b and 4b. This flow of compressed air via the air dryer 61 and the throttle 62 serves to pressurize the opposing effective area 75A which, in the figures, is the left-hand side of control chamber 76. As the compressed air guided from the compressed air supply 1 via the air dryer 61 also passes the throttle 62, which has a smaller diameter than the pilot port of the air removal chamber 3', the pressure on the opposing effective area 75A (left-hand side of diaphragm 75) is lesser than the pressure on the effective area 75S (right-hand side of the diaphragm 75). Thus the diaphragm 75 with a connected plunger 79 moves to the left so that the valve seal 78 seals the valve orifice 77.

Holding the exhaust valve 71 in the closed state CS, air from the air dryer 61 passes through the pneumatic main line 60 to the compressed air port 2 in order to supply a pneumatic installation connected to compressed air port. This charging flow is depicted in FIGS. 2a and 4a via the solid line exiting from the air dryer 61 and leading to the compressed air port 2.

The exhaust valve 71 is held in the closed state CS as a force FS exerted on the effective area 75S due to pressurizing the effective area 75S of the exhaust valve 71 is higher than a counterforce FA exerted on the opposing effective area 75A due to pressurizing the opposing effective area 75A of the exhaust valve 71.

The force FS exerted on the effective area 75S comprises a first force component FS1 originating from compressed air acting on the effective area 75S and a second force component FS2 originating from the counter spring 73. Likewise, the counterforce FA exerted on the opposing effective area 75A comprises a first counterforce component FA1 originating from compressed air acting on the opposing effective area 75A and a second counterforce component FA2 originating from the valve spring 72.

In the following the regeneration cycle RC will be described. The regeneration cycle RC can be best understood from FIGS. 5a and 5b. When the air compressor unit 21 is suspended from operation and compressed air is to be released from the compressed air port 2, a flow of compressed air from the compressed air port 2 is guided to the counter pressure control port 71A thereby pressurizing the opposing effective area 75A (left-hand side of diaphragm 75). Also a flow of compressed air that originates from the compressed air port 2 is guide via the throttle 62 and the air dryer 61 (indicated by the solid arrows pointing to the left) and reaches (indicated by the dot-dashed line) the opposing effective area 75S via the pressure control port 71S, which is embodied by a pilot port exiting the air removal chamber 3'. As a portion of the compressed air passes through the air dryer 61 and particularly the throttle 62 the pressure on the opposing effective area 75A (left-hand side of diaphragm 75) is higher than on the effective area 75S (right-hand side of the diaphragm 75).

Figure 5A:
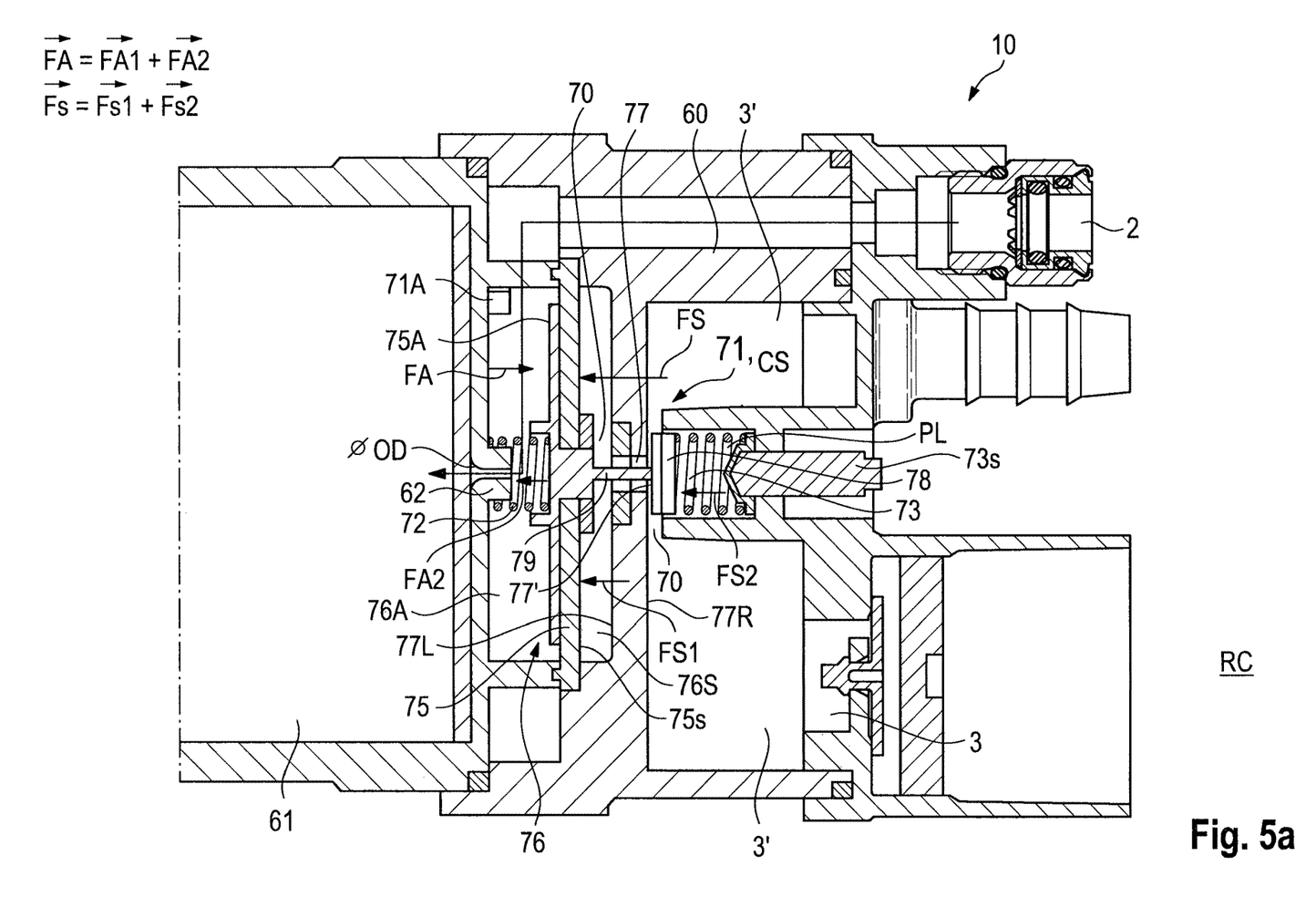
Figure 5B:
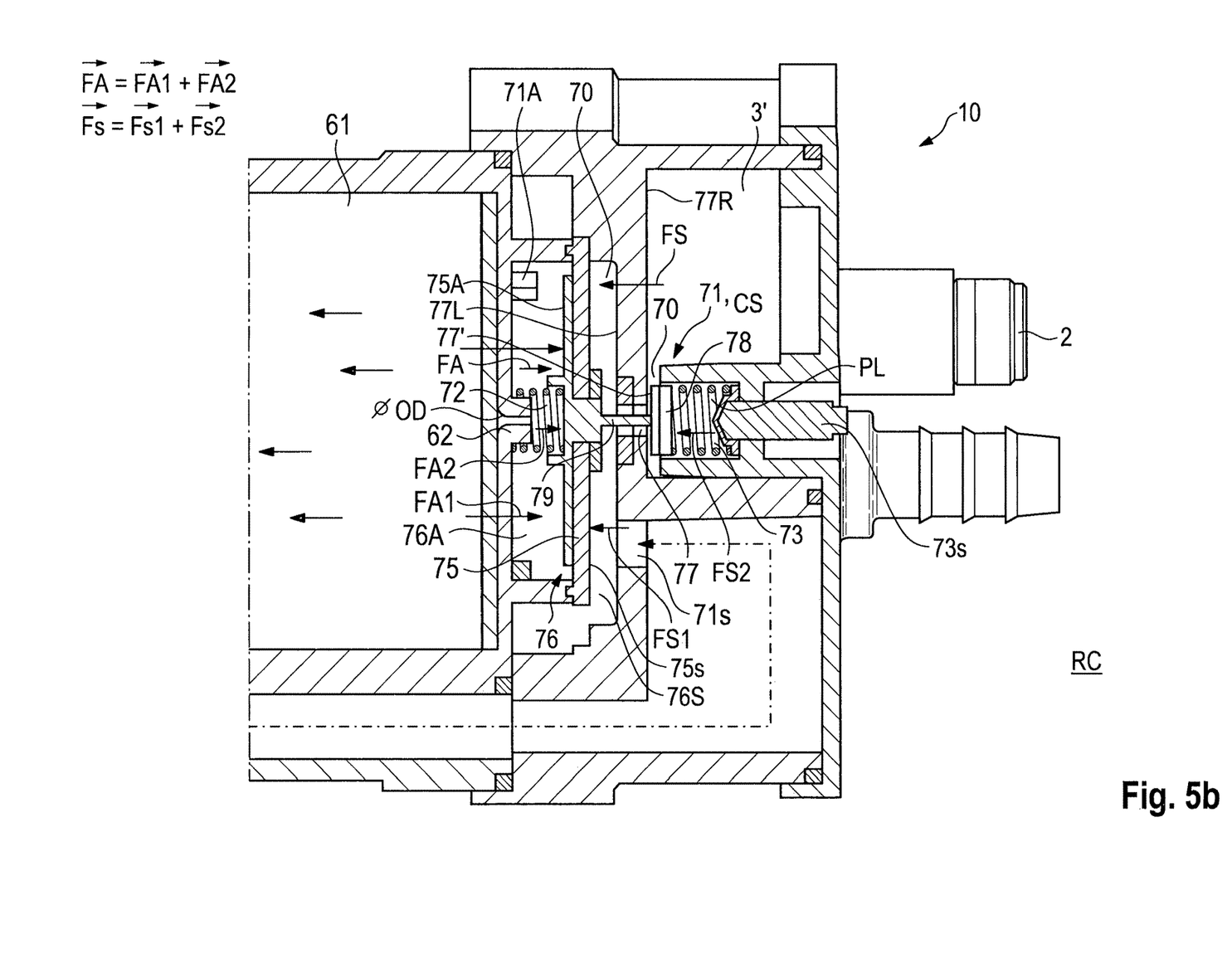
FIG. 5b illustrates a cutout enlargement from FIG. 3b.

Thus the exhaust valve 71 is switched into the open state thereby the valve seal 78 unseals the valve orifice 77 and compressed air can pass from the compressed air port 2 via the air dryer 61 and the throttle 62, which are arranged in the air removal line 70 to the air removal port 3 shown on the lower right hand side of FIG. 5a.

In the preferred embodiment of FIG. 2 to FIG. 6, the throttle 62 has an orifice diameter OD between 0.7 mm and 1.2 mm.

Figure 6:
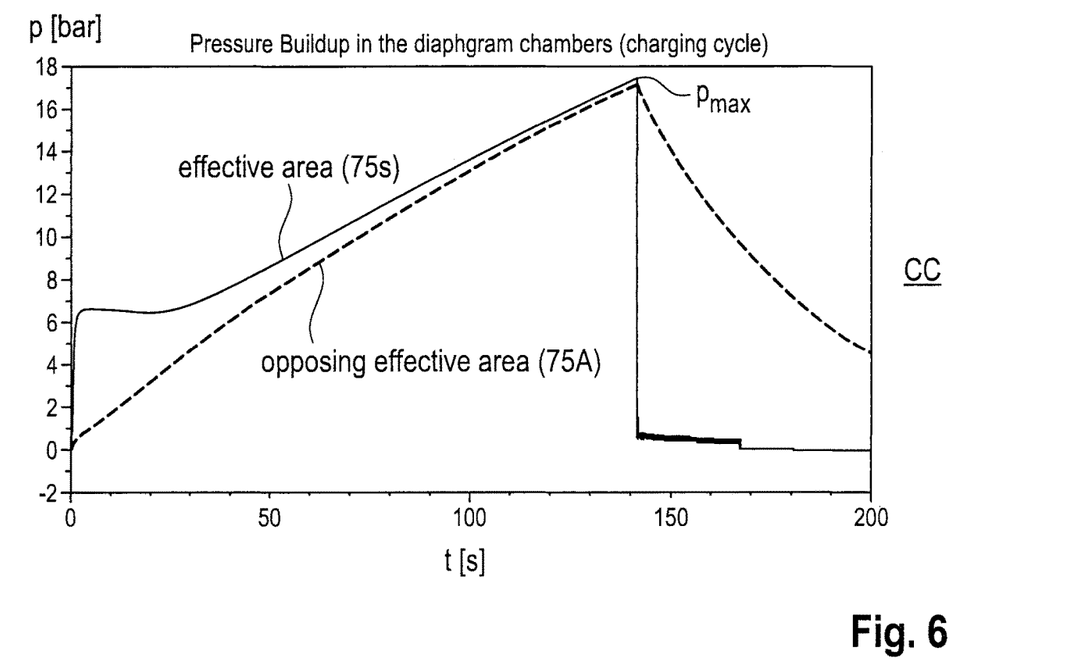
FIG. 6 illustrates a schematic diagram of a pressure build-up in the diaphragm chambers.

A pressure build-up in the control chamber 76 during a charging cycle becomes apparent from FIG. 6. The y-axis depicts the pressure in bar of the respective sub-chamber 76A, 76S of the control chamber 76 while the x-axis depicts time in seconds.

Initially (t=0 s) the air compressor 21 is set into operation. The solid line represents a build-up of a pressure acting on the effective 75S, while the dashed line represents the build-up of pressure acting on the opposing effective area 75A. The solid line shows faster pressure build-up as the compressed air reaching the effective area 75S does not pass the air dryer and the throttle 62. As the pressure force exerted on the effective area 75S is higher than a counter force exerted on the opposing effective 75A, the exhaust valve 71 is held in closed state CS for about 140 seconds until a pressure of about 17 bar on both opposing effective area side 75A and effective area side 75S is reached.

At a pressure of about 17 bar the relief function enabled by the serial arrangement of the diaphragm 75, the valve spring 72 and counter spring 73 becomes apparent. That is at about 17 bar the pressure on both sub-chambers 76A, 76S of the control chamber 76 are roughly equal, so that compressed air is relieved into the air removal line 70. As can be seen from the diagram starting from about 140 seconds, the pressure acting on the effective area 75S immediately drops to about 1 bar as this air freely, that is without throttling via throttle 62, enters the air removal line 70 to the air removal port 3. The dashed line representing the pressure on the opposing effective area 75S exhibits a typical exponential relief due to the air passing through the throttle 62 and from there via the air dryer 61 into the air removal line 70.

Figure 7:
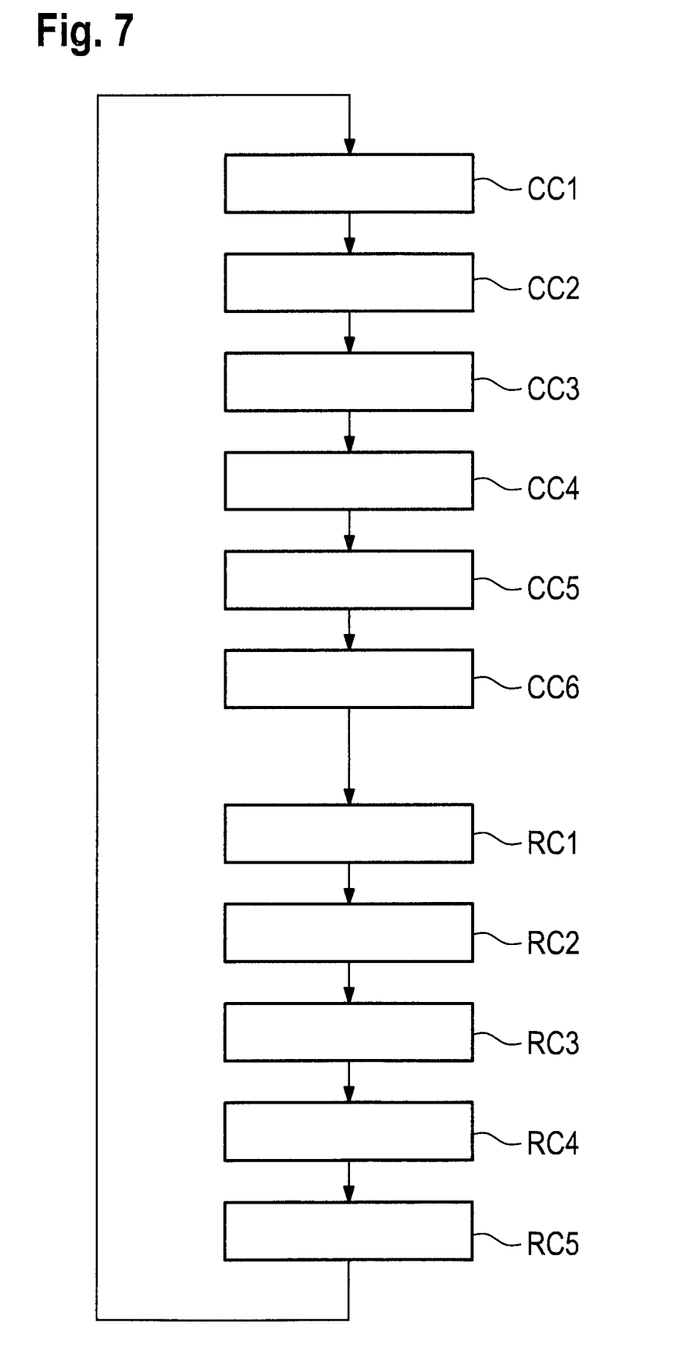
FIG. 7 illustrates a method for operating a compressed-air supply system according to an embodiment of the invention.

FIG. 7 shows a typical method of operating a compressed air supply system 10. The step CC1 to CC6 represent the charging cycle, while the steps RC 1 to RC 5 represent the regeneration cycle.

In a first step CC1 the air compressor unit 21 is operated to force plain compressed air to the compressed air supply 1. In a step CC2 compressed air is guided from the compressed air supply 1 to the pressure control port 71S thereby pressurizing the effective area 75S of the exhaust valve in order to switch the exhaust valve 71 into the closed state CS. In step CC3 a flow of compressed air is guided from the compressed air supply 1 via the air dryer 61 and the throttle 62 to the compressed air port 2 in order to supply a pneumatic installation connected to the compressed air port. In step CC4 a flow of compressed air is guided from the compressed air supply 1 via the air dryer 61 and the throttle 62 to the pressure counter control port 71A and thereby pressurizing the opposing effective area 75A of the exhaust valve 71. In step CC5 the exhaust valve 71 is held in a closed state CS if a force exerted on effective area 75S is higher than a counter force exerted on the opposing effective area 75A, while. In step CC6 the exhaust valve 71 is switched to open state if a force exerted on effective area 75S is lower than a counter force exerted on the opposing effective area 75A. One or more steps can be performed parallel.

In a first step RC1 of the regeneration cycle the air compressor unit 21 is suspended from operation. In second step RC2 a flow of compressed air is guided from the compressed air port 2 to the counter pressure control port 71A and thereby the opposing effective area 75A of the exhaust valve 71 is pressurized.

In a third step RC3 a flow of compressed air is guided from the compressed air port 2 to the pressure control port 71S via air dryer 61 and the throttle 62. Thereby the opposing effective area 65S of the exhaust valve 71 is pressurized.

In a fourth step RC4 the exhaust valve 71 is switched into the open state if a force exerted on effective area 75S is lower than a counter force exerted on the opposing effective area 75A.

In step RC5 a flow of compressed air from the compressed air port 2 is guided via the air removal line 70 to the air removal port 3.

In a sixth step RC6 the exhaust valve 71 is switched into the open state if a force exerted on the effective area 75S is lower than a counter force exerted on the opposing effective area 75A.

One or more of the steps RC1 ... to RC5 can be performed parallel.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES 1 air supply
1' supply chamber
2 compressed air port
2' delivery chamber
3 air removal port
5 air filter
10 Compressed-air supply system
21 Air compressor unit
21.1 air compressor
21.2 compressor chamber
21.3 motor
60 pneumatic main line
61 air dryer
62 throttle
70 air removal line
71 exhaust valve
71A pressure counter control port
71S pressure control port
72 valve spring
73 counter spring
75 diaphragm
75A second effective area of diaphragm
75S first effective area of diaphragm
76 control chamber
76A, 76S sub-chambers of the control chamber
77 valve orifice
77L, 77R opposite sides of the valve orifice
77' valve seat
78 valve seal
79 plunger
90 pneumatic installation
100 pneumatic system
1000 vehicle
AA effective size of the effective area
AS effective size of the opposing effective area
CC charge cycle
CC1 ... CC6 steps of the charge cycle
FS force exerted on the effective area
FS1 first force component originating from compressed air acting on the effective area
FS2 second force component originating from the counter spring
FA counterforce exerted on the opposing effective area
FA1 first counterforce component originating from compressed air acting on the opposing effective area
FA2 second counterforce component originating from the valve spring
OS opened state of the exhaust valve
OD orifice diameter of the throttle
CS closed state of the exhaust valve
PL preload of the counter spring
RC regeneration cycle
RC1 ... RC 5 steps of the regeneration cycle
PRC pressure relief component

The invention claimed is:

1. A compressed-air supply system for operating a pneumatic installation, the compressed-air supply system comprising:
an air supply, comprising an air compressor unit configured to supply compressed air to a compressed air supply;
a compressed air port to the pneumatic installation;
an air removal port configured to release air to the environment;
a pneumatic main line between the compressed air supply and the compressed air port, the pneumatic main line comprising an air dryer and a throttle;
an air removal line between the compressed air port and the air removal port, the air removal line branching from the pneumatic main line;
an exhaust valve connected in the air removal line, wherein the exhaust valve comprises a pressure control port connected to the compressed air supply and a pressure counter control port connected to the compressed air port,
wherein the exhaust valve comprises a control chamber that is fluidically partitioned by a diaphragm configured to switch the exhaust valve between an opened and a closed state, the diaphragm having an effective area pressurizable via the pressure control port and an opposing effective area pressurizable via the pressure counter control port, and
wherein the exhaust valve is configured to be normally opened.

2. The system according to claim 1, wherein the pressure control port and the pressure counter control port are fluidically connected to each other, independently of pressure, via the air dryer and the throttle.

3. The system according to claim 1, wherein the exhaust valve is configured to switch to and/or remain in the closed state if a force exerted on the effective area is higher than a counterforce exerted on the opposing effective area, and is configured to switch to and/or remain in the open state if a force exerted on the effective area is lower than a counterforce exerted on the opposing effective area.

4. The system according to claim 1, wherein the exhaust valve is configured to relieve, in a charging cycle, compressed air into the air removal line if the absolute pressure on both sides of the diaphragm exceeds 16 bar.

5. The system according to claim 1, wherein the exhaust valve comprises an orifice defining a valve seat, and a plunger having a valve seal for opening and closing the orifice, wherein the plunger is coupled to the diaphragm.

6. The system according to claim 5, wherein the diaphragm and the valve seal are arranged on opposite sides of the orifice.

7. The system according to claim 5, wherein the exhaust valve comprises a valve spring that is serially coupled to the diaphragm and arranged to hold the exhaust valve normally opened.

8. The system according to claim 7, wherein the exhaust valve comprises a counter spring that is serially coupled to the diaphragm and arranged to counteract the valve spring.

9. The system according to claim 8, wherein the diaphragm is coaxially arranged to the orifice.

10. The system according to claim 8, wherein a preload of the counter spring is adjustable.

11. The system according to claim 8, wherein the valve spring and the counter spring have identical spring constants.

12. The system according to claim 1, wherein the effective area and the opposing effective area are equal in effective size.

13. The system according to claim 1, wherein the throttle has an orifice diameter between 0.7 mm and 1.2 mm.

14. A pneumatic system comprising a compressed-air supply system according to claim 1 and a pneumatic installation in form of an air-suspension system of a vehicle.

15. A method for operating a compressed-air supply system, the method comprising:
in a charge cycle, the steps of:
operating an air compressor unit configured to supply compressed air to a compressed air supply;
guiding a flow of compressed air from the compressed air supply to a pressure control port and thereby pressurizing an effective area of an exhaust valve in order to switch the exhaust valve into a closed state;
guiding a flow of compressed air from the compressed air supply via an air dryer and a throttle to a compressed air port in order to supply a pneumatic installation connected to the compressed air port;
guiding a flow of compressed air from the compressed air supply via the air dryer and the throttle to a pressure counter control port and thereby pressurizing an opposing effective area of the exhaust valve; and
holding the exhaust valve in a closed state if a force exerted on the effective area is higher than a counterforce exerted on the opposing effective area,
and/or, in a regeneration cycle, the steps of:
keeping the air compressor unit suspended from operation;
guiding a flow of compressed air from the compressed air port to the counter pressure control port and thereby pressurizing the opposing effective area of the exhaust valve;
guiding a flow of compressed air from the compressed air port to the pressure control port via the air dryer and the throttle and thereby pressurizing the effective area of the exhaust valve;
switching the exhaust valve into the opened state if a force exerted on the effective area is lower than a counterforce exerted on the opposing effective area;
guiding a flow of compressed air from the compressed air port via the air removal line to the air removal porta,
wherein the exhaust valve is configured to be normally opened.

16. The method according to claim 15, further comprising, in the charge cycle the step of:
switching the exhaust valve into the opened state if a force exerted on the effective area is lower than a counterforce exerted on the opposing effective area.

17. The method according to claim 15, wherein the exhaust valve is held in and/or switched into the closed state if a force exerted on the effective area due to pressurizing the effective area of the exhaust valve is higher than a counterforce exerted on the opposing effective area due to pressurizing the opposing effective area of the exhaust valve.

18. The method according to claim 15, wherein the exhaust valve is held in and/or switched into the opened state if a force exerted on the effective area due to pressurizing the effective area of the exhaust valve is lower than a counterforce exerted on the opposing effective area due to pressurizing the opposing effective area of the exhaust valve.

19. The method according to claim 16, wherein the force exerted on the effective area comprises a first force component originating from compressed air acting on the effective area and a second force component originating from a counter spring.

20. The method according to claim 16, wherein the counterforce exerted on the opposing effective area comprises a first counterforce component originating from compressed air acting on the opposing effective area and a second counterforce component originating from a valve spring.

* * * * *